United States Patent van der Lely

[11] 3,897,831
[45] Aug. 5, 1975

[54] ROTARY HARROWS WITH SCREENS

[76] Inventor: Cornelis van der Lely, 7, Bruschenrain, Zug, Switzerland

[22] Filed: Jan. 4, 1973

[21] Appl. No.: 320,873

[30] Foreign Application Priority Data
Jan. 5, 1972 Netherlands............... 7200086

[52] U.S. Cl............ 172/112; 172/59; 172/117
[51] Int. Cl............................. A01b 33/12
[58] Field of Search.......... 172/49, 59, 110–113, 172/117, 261, 264, 509, 522, 523, 526, 705, 706; 56/295, 320.1

[56] References Cited
UNITED STATES PATENTS

| | | | |
|---|---|---|---|
| 113,449 | 4/1871 | Radley | 172/111 X |
| 2,582,364 | 1/1952 | Tice | 172/112 X |
| 2,838,901 | 6/1958 | Davis | 56/13.6 X |
| 3,012,389 | 12/1961 | Jacobs | 56/13.6 X |
| 3,616,862 | 11/1971 | van der Lely | 172/59 X |
| 3,774,689 | 11/1973 | van der Lely et al. | 172/112 |

Primary Examiner—Edgar S. Burr
Assistant Examiner—Paul T. Sewell
Attorney, Agent, or Firm—Mason, Mason & Albright

[57] ABSTRACT

A rotary harrow has side-by-side rotary soil-working members which work overlapping strips of land. One or more knife-shaped soil-working members or tines are secured to the frame in bearings and which are protected by screens that can include collars and plates at the bottom of the frame. The tines are mounted on supports and can comprise one or two tines having the same or unequal lengths. The tines can be displaceable about a pivot on the supports that spring bias the tines against a stop.

12 Claims, 14 Drawing Figures

3,897,831

1

ROTARY HARROWS WITH SCREENS

According to one aspect of the present invention, there is provided a rotary harrow of the kind set forth, wherein each soil working member or rotor comprises only a single downwardly extending substantially straight tine-or knife-shaped soil working portion, and wherein the construction and relative arrangement of two laterally neighbouring soil working members or rotors of the harrow are such that the strips of land which they work during operation of the harrow overlap one another. With such a construction the soil working members or rotors can be manufactured at a reduced cost and the power consumption of the harrow is lower than when rotors having multiple tines or the like are employed because the resistance to movements of the single tines or the like through the soil is considerably less.

Figure 1:
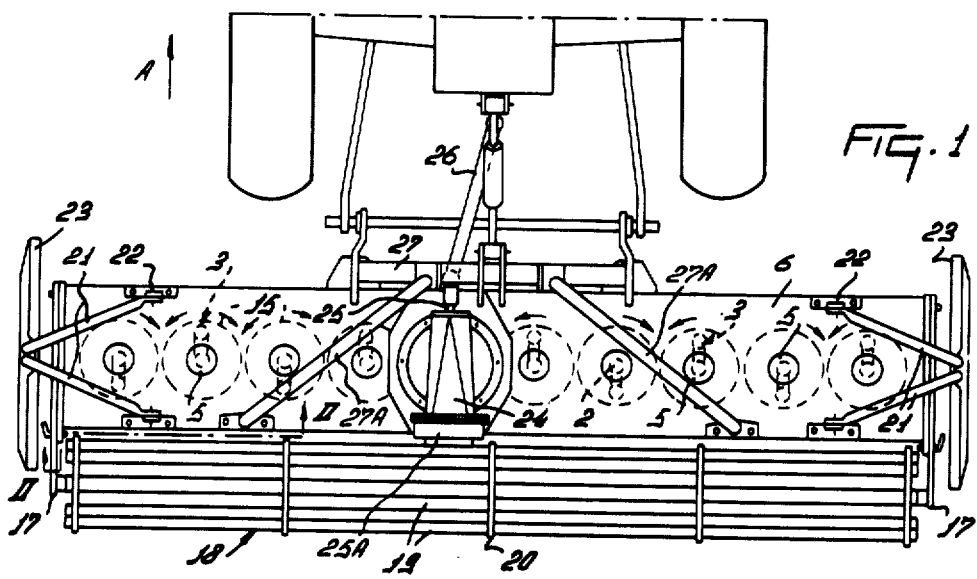
Figure 2:
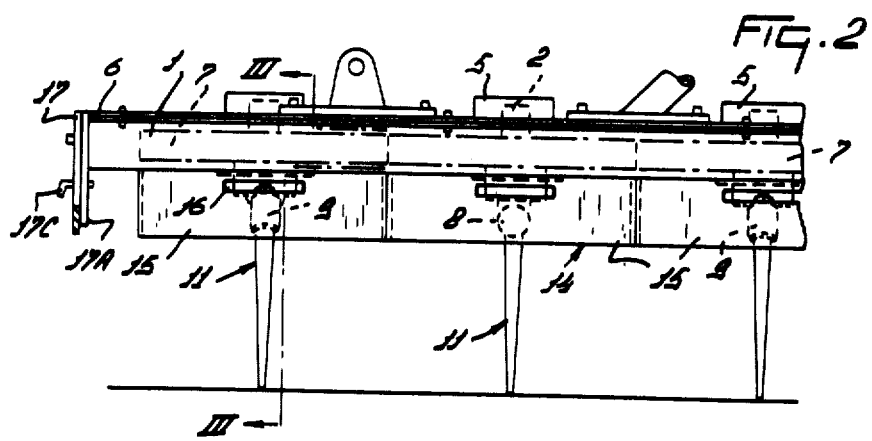
Figure 3:
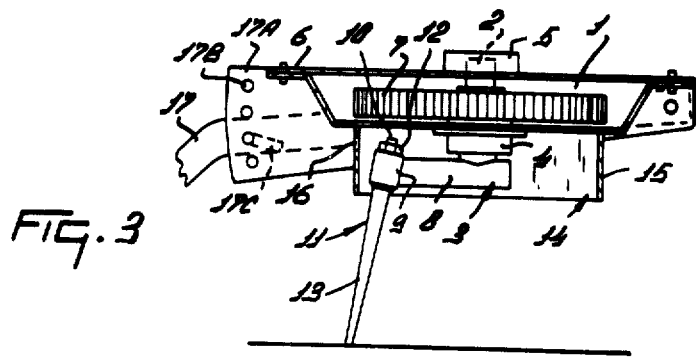
Figure 4:
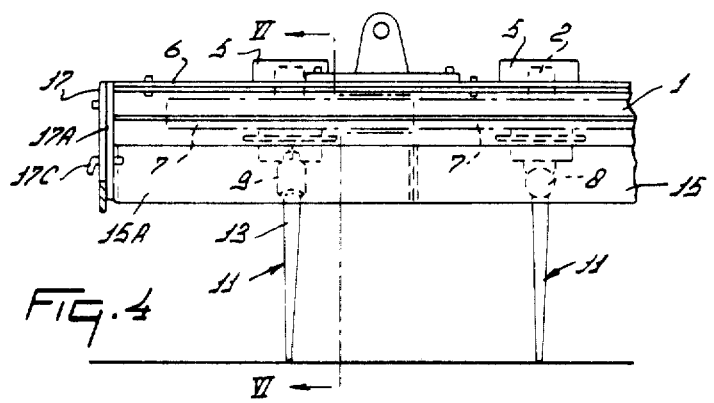
Figure 5:
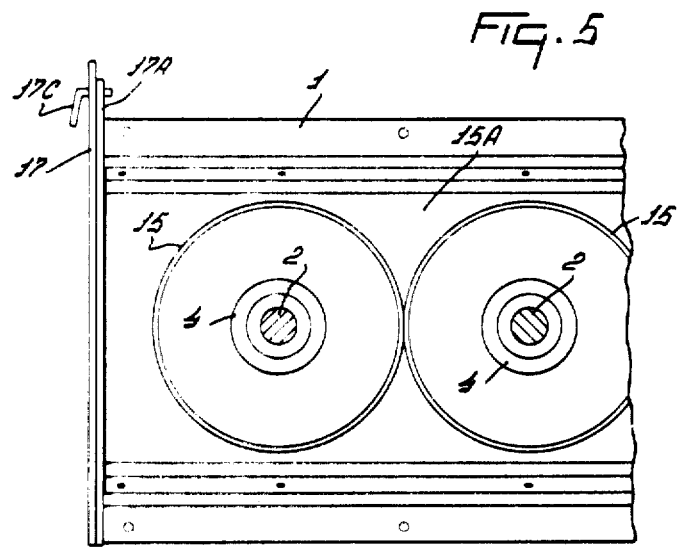
Figure 6:
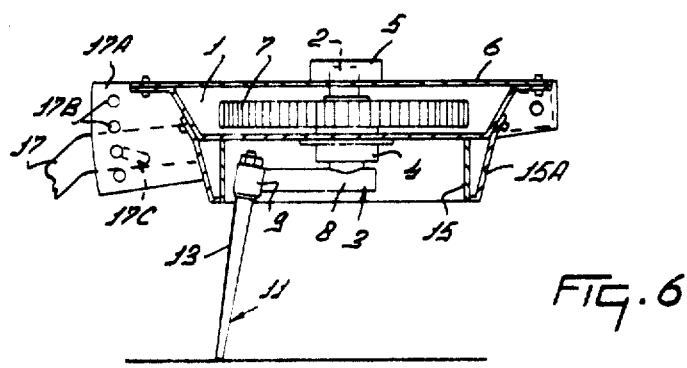
Figure 7:
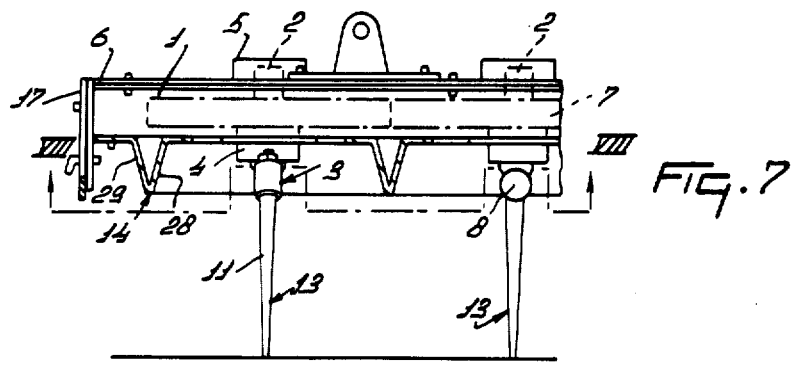
Figure 8:
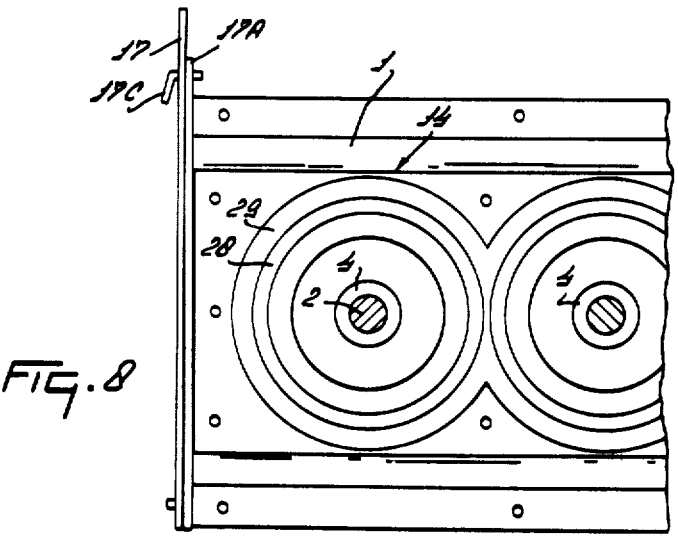
Figure 11:
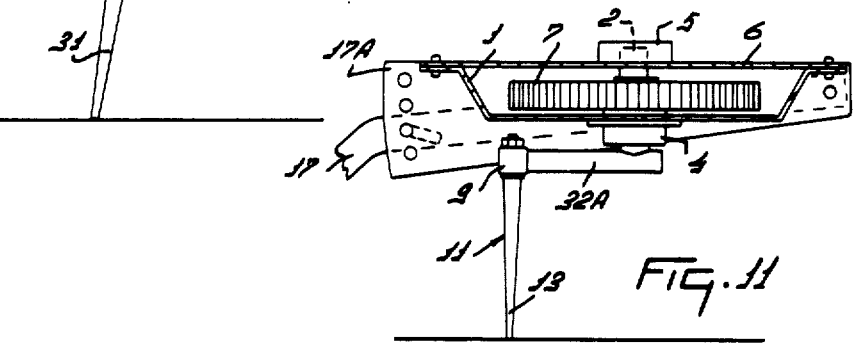
Figure 12:
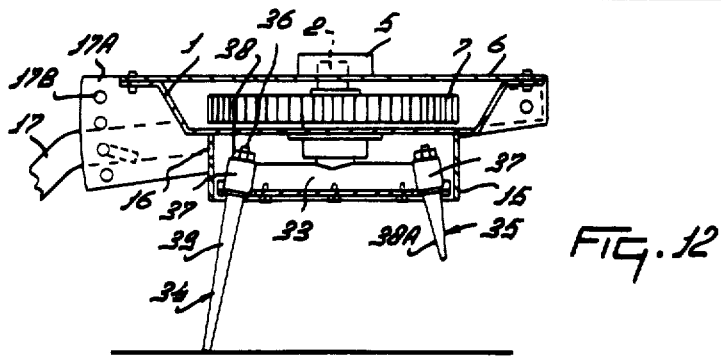
Figure 13:
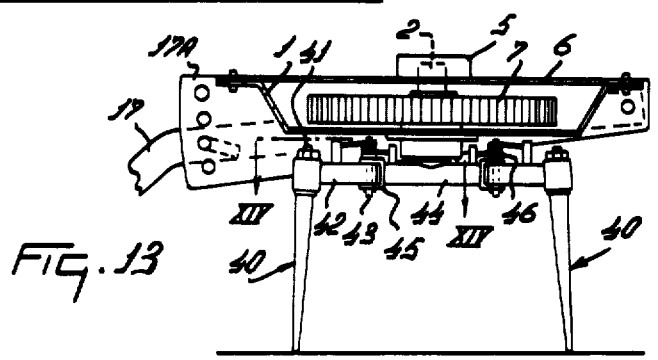
Figure 14:
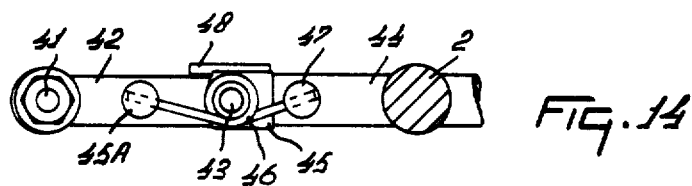

For a better understanding of the invention, and to show how the same may be carried into effect, reference will now be made, by way of example, to the accompanying drawings, in which:

FIG. 1 is a plan view of a rotary harrow in accordance with the invention mounted at the rear of an agricultural tractor, FIG. 2 is a section, to an enlarged scale, taken on the line II—II of FIG. 1, FIG. 3 is a section taken on the line III—III of of FIG. 2, FIG. 4 is a sectional view corresponding to FIG. 2 but showing an alternative construction, FIG. 5 is an underneath plan corresponding to FIG. 4, FIG. 6 is a section taken on the line VI—VI in FIG. 4, FIG. 7 again corresponds to FIG. 2 but shows a further alternative construction, FIG. 8 is a section taken on the line VIII—VIII of FIG. 7, FIGS. 9, 10, 11, 12 and 13 all correspond to FIGS. 3 and 6 and show further alternative embodiments, and FIG. 14 is a section, to an enlarged scale, taken on the line XIV—XIV of FIG. 13.

Referring to FIGS. 1 to 3 of the drawings, the rotary harrow which is illustrated has a frame which is comprised principally by a frame portion 1 that extends substantially horizontally perpendicular to the intended direction of operative travel of the harrow that is indicated by an arrow A in FIG. 1 of the drawings, said frame portion 1 being in the form of a hollow sheet iron beam or casing. The frame portion 1 rotatably supports a plurality of soil working members or rotors 3 that are disposed side-by-side in a single row and of which it is preferred that there should be at least 10, as illustrated. Each soil working member or rotor 3 is rotatable about the axis of a corresponding upwardly extending shaft 2 which is preferably a vertical or substantially vertical shaft. Each shaft 2 is spaced apart from its neighbour, or from each of its neighbors, by a distance of substantially 25 centimeters, its lower and upper ends being journalled in corresponding lower and upper bearings 4 and 5 respectively. The lower bearings 4 are supported in recesses of the bottom plate of the frame portion 1 while the upper bearings 5 are secured to a top plate 6 by which the upper surface of the frame portion 1 is closed. Each shaft 2 is provided, inside the hollow frame portion 1 and between the corresponding bearings 4 and 5, with a corresponding straight- or spur-toothed pinion 7 and it will be seen from the drawings that each pinion 7 has its teeth in mesh with those of its neighbour, or both of its neighbours.

The lower end of each shaft 2 that projects from beneath the corresponding bearing 4 has a corresponding substantially horizontal tine support 8 rigidly secured thereto in such a way that each support 8 projects substantially radially from its shaft 2 effectively in only one direction. The end of each tine support 8 that is remote from the corresponding shaft 2 has a corresponding sleeve-shaped tine holder 9 rigidly secured to it, said holder 9 receiving the fastening portion 10 of a corresponding tine 11. The screw-threaded upper end of the fastening portion 10 receives a nut 12 which secures the tine 11 in its holder 9.

It can be seen from FIGS. 1 and 2 of the drawings that neighbouring soil working members or rotors 3, which rotate in opposite directions during operation of the harrow, have their tine holders 8 turned through 180° about the axes of the corresponding shafts 2 relative to one another. Thus, when half the total number of tines 11 are disposed as far forwardly as possible with respect to the direction A, the other half thereof will be disposed as far to the rear as is possible relative to that direction. Each tine 11 has a lower soil working portion 13 and it can be seen from FIG. 3 of the drawings that the tine holders 9 and tines 11 are arranged in such a way that the soil working portions 13 extend downwardly and outwardly relative to the corresponding axes of rotation that are afforded by the shafts 2. With this arrangement, the circuits that are traced by the tips of the tines 11 during rotation of the shafts 2 are of greater diameter than the distances between said shafts so that the strips of land that are worked by the individual members or rotors 3 overlap one another to produce, in effect, a single broad strip of worked soil.

A cylindrical collar 15 is secured to the lower surface of the frame portion 1 in substantially concentrically surrounding relationship to the axis of rotation afforded by the corresponding shaft 2, the 10 (in this embodiment) cylindrical collars 15 together affording a protective screen 14. As can be seen in FIG. 3 of the drawings, each cylindrical collar 15 completely surrounds the corresponding tine support 8, tine holder 9 and all or most of the tine fastening portion 10. The collar 15 extends downwardly to a horizontal level beneath that of the lowermost extremity of the corresponding tine holder 9. The collars 15 bear against one another (see FIG. 2) and a rearmost region of each of them is formed with a substantially horizontal slot 16 through which slot a suitably shaped spanner or wrench may be inserted to tighten or loosen the fastening nut 12 of the corresponding tine 11.

Each of the opposite lateral sides or ends of the frame portion 1 has a corresponding arm 17 turnably connected to its leading extremity by a substantially horizontal pivot, said arms 17 being turnable upwardly and downwardly alongside generally sector-shaped plates 17A that are fastened to the frame portion 1. Each plate 17A has a curved row of holes 17B formed along its rearmost edge with respect to the direction A, each of said holes 17B being at the same distance from the corresponding substantially horizontal pivot so that a single hole through the neighbouring arm 17 can be brought into register with any chosen one of the holes. Horizontal locking pins 17C are provided for entry through the single holes in the arms 17 and through chosen holes 17B to maintain the arm 17 in corresponding angular settings about their pivotal connections with the frame portion 1. The downwardly bent-over rear ends (with respect to the direction A) of the two arms 17 rotatably carry a supporting and soil compression member in the form of a roller 18. The soil-engaging periphery of the roller 18 is afforded principally by a plurality of elongated tubular elements 19 that are regularly spaced apart from one another around the axis of rotation of the roller by being entered through peripheral openings in five regularly spaced substantially vertical support plates 20 that are of circular or substantially circular configuration. Each element 19 extends substantially parallel to a central shaft (not visible) affording the axis of rotation of the roller 18 but it is possible, if desired, to wind the elements 19 helically around the axis of said central shaft to some extent. It is preferred that each tubular element 19 should be of substantially circular cross-section and that it should be entered with some clearance through the peripheral holes in the plates 20 by which it is supported.

Plates 23 that are normally substantially vertically disposed are located at short distances beyond the opposite lateral ends of the row of soil working members or rotors 3. Each plate 23 is connected by a corresponding pair of arms 21 and substantially horizontal pivots 22 to brackets rigidly secured to the top plate 6 of the frame portion 1 alongside the front and rear edges of that plate. Each pair of pivots 22 affords a corresponding axis that extends substantially parallel to the direction A and it will be evident from the drawings that the plates 23 can turn upwardly and downwardly about said axes to match undulations in the surface of the soil over which their lowermost edges will slide when the harrow is in use. When the harrow is undergoing inoperative transport, the plates 23 can be turned upwardly about the axes afforded by the pivots 22 through substantially 180° to bring them to inverted positions in which they lie above the top plate 6 of the frame portion 1.

The left-hand one (as viewed in the direction A) of the central pair of soil working members or rotors 3 has its shaft 2 extended upwardly into a gear box 24 that is mounted on top of the frame portion 1 and that has a rotary input shaft 25 projecting forwardly therefrom in substantially the direction A. The rotary input shaft is splined or otherwise keyed for connection to the power take-off shaft of an agricultural tractor or other operating vehicle by way of an intermediate telescopic transmission shaft 26 of known construction having universal joints at its opposite ends. Such an arrangement is shown in outline in FIG. 1 of the drawings. The gear box 24 comprises an upper substantially horizontal shaft that is driven from, or integral with, the rotary input shaft 25 and a lower relatively parallel shaft which transmits rotation to the aforementioned extension of one of the shafts 2 by way of inter-meshing bevel pinions. The rearmost ends of the two parallel shafts both extend into a change-speed gear 25A which contains meshing pinions of different sizes which pinions can preferably be interchanged and/or exchanged for at least one further pair of pinions to enable different speeds of rotation of the shafts 2 to be attained in respect of a constant speed of rotation of the input shaft 25. The change-speed gear 25A has a dirt-excluding cover which can be temporarily removed when the pinions beneath it are to be lubricated, interchanged or exchanged. The front of the frame portion 1 with respect to the direction A is provided with a generally triangular coupling member 27 that is adapted for connection in a known manner to the three-point lifting device or hitch of an agricultural tractor or other operating vehicle in the manner that can be seen in outline in FIG. 1 of the drawings. Strengthening tie bars 27A extend between an upper region of the coupling member 27 and the top and rear of the frame portion 1.

In the use of the rotary harrow that has been described, it is moved over a field in the direction A by the agricultural tractor shown in FIG. 1 of the drawings or some other operating vehicle, the soil working members or rotors 3 being rotated about the axes of the corresponding shafts 2, in opposite directions as regards neighbouring soil working members or rotors 3, the rotation being derived from the power take-off shaft of the tractor or other operating vehicle by way of the telescopic transmission shaft 26, the input shaft 25, the gear box 24, the change-speed gear 25A and the aforementioned upward extension (not visible) of one of the shafts 2. Each soil working member or rotor 3 should rotate at a speed of not less than substantially 400 revolutions per minute and it is preferred that said speed should be substantially 500 revolutions per minute so that a broad strip of land can be completely tilled in one traverse of the harrow by the single tines of the individual soil working members or rotors 3. As previously mentioned, the narrow strips of land worked by the individual soil working members or rotors 3 overlap one another due to the diameters of the circular paths traced by the tip of the tines 11 being greater than the distances between the shafts 2. The 180°staggering of the tines of neighbouring soil working members or rotors 3 ensures that said tines will not foul one another and also ensures a maximum degree of cooperation between the neighbouring members or rotors 3.

The screen 14 which comprises the collars 15 in the embodiment of FIGS. 1 to 3 of the drawings simply and effectively ensures a maximum degree of protection to the supports 8, tine holders 9, tine fastening portions 10 and nuts 12 against damage by stones and other hard objects displaced by the tines during harrowing operations, particularly harrowing operations on stoney soil. Since the collars 15 substantially completely surround the parts 8, 9, 10 and 12, very few indeed, if any, stones find their way into contact with the upper ends of the tines and the parts by which those tines are rotated and supported. The use of only one tine 11 per soil working member or rotor 3 allows the soil working members or rotors 3 to be manufactured more simply and cheaply without losing efficiency in the cultivation or harrowing of the soil. The described arrangement also greatly reduces the risk of stones or other obstacles becoming jammed between the tines of the rotating soil working members 3. The speed of rotation of the shafts 2 can be varied between a minimum of substantially 400 revolutions per minute and a preferred value of substantially 500 revolutions per minute by appropriate adjustments of the change-speed gear 25A as briefly described above. It will be remembered that such adjustments vary the speeds of rotation of the shafts 2 without requiring an alteration in the speed of rotation of the input shaft 25. A speed of rotation of the shafts 2 appropriate to the nature and condition of the soil being worked can accordingly be chosen without difficulty. The depth of penetration of the soil working portions 13 of the tines 11 into the soil is governed principally by the level of the axis of rotation of the roller 18 relative to the remainder of the harrow and such level can be adjusted as required by entering the locking pins 17C through appropriate holes 17B in the plates 17A.

FIGS. 4 to 6 of the drawings show an alternative construction in which the lowermost edges of the cylindrical collars 15 are interconnected by a plate 15A whose flat bottom extends substantially horizontally perpendicular to the axes of the shafts 2 but whose front and rear regions with respect to the direction A are bent over upwardly to join the frame portion 1 in the manner which can be seen best in FIG. 6 of the drawings. The substantially horizontal portion of the plate 15A is, of course, formed with openings that are of the same size as the lower ends of the collars 15 and that register with the mouths defined by those collars. The plate 15A is welded around the mouths defined by the lowermost ends of said collars 15.

FIGS. 7 and 8 of the drawings illustrate a further alternative construction in which the screen 14 is afforded by a plurality of collars 28 (one in respect of each soil working member or rotor 3) that are afforded by punched parts of a plate 29 bolted to the bottom of the frame portion 1. Each collar 28 extends substantially concentrically around the axis of the corresponding shaft 2 but its wall diverge outwardly and downwardly from top to bottom so that the mouths of the collars 28 are of greater diameter than the upper ends thereof that merge into substantially horizontal apertured portions of the plate 29. Once again, the lowermost extremities of the collars 28 are located at a horizontal level at least as low as the bottom of the fastening portions 10 of the tines 11.

Figure 9:
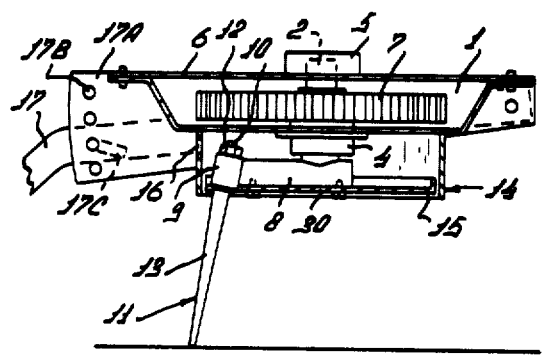

FIG. 9 illustrates an embodiment in which the screen 14 includes parts in the form of plates 30 whose planes are substantially perpendicular to the longitudinal axes of the shafts 2 and that are located upwardly just inside the mouths of the collars 15. The plates 30 are fastened to the bottoms of the tine supports 8 by small bolts and there is only a minimal clearance between their edges and the interiors of the corresponding collars 15. The tines 11 extend through openings in the plates 30. The screens 14 in the embodiments of FIGS. 4 to 8 of the drawings may also be provided with parts equivalent to the plates 30. The plates 30 substantially eliminate the small risk of stones getting inside the collars 15 and jamming between those collars and the supports 8 or tine holders 9.

Figure 10:
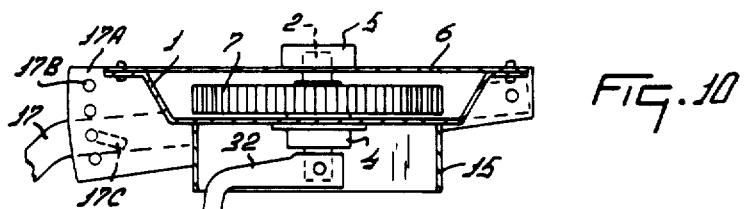

FIG. 10 illustrates an embodiment in which the screen is identical to that already described with reference to FIGS. 1 to 3 of the drawings but in which the tines 31 and their supports 32 are formed integrally as single units. The soil working members or rotors can be provided both simply and cheaply with this construction.

FIG. 11 illustrates an embodiment in which each tine support 32A has a radial length with respect to the axis of rotation of the corresponding shaft 2 that is greater than half the perpendicular distance between the shafts 2 of two neighbouring soil working members or rotors 3. The tines 11 may be disposed substantially vertically with this construction of the supports 32A while ensuring that the strips of land worked by individual members or rotors 3 will overlap one another to produce a single broad strip of worked land during the use of the rotary harrow. The substantially vertical axes of the tines 11 will, under these circumstances, be substantially parallel to the axes of rotation afforded by the shafts 2.

FIG. 12 of the drawings illustrates a construction which is similar to that illustrated in FIG. 9 except that, in this case, the tine support 8 is replaced by a tine support 33 which extends radially beyond the corresponding shaft 2 in opposite directions by substantially equal distances. The opposite ends of the support 33 carry tine holders 37 that are inclined to the vertical by a few degrees and these tine holders 37 carry a long tine 34 and a short tine 35 respectively. Each tine has an upper fastening portion 36 having a screwthreaded upper end which receives a corresponding nut 38 which is tightened to secure the fastening portion 36 in its holder 37. The soil working portion 38A of the short tine 35 has a length which is equal to not less than substantially one-third of the length of the soil working portion 39 of the long tine 34. Once again, the two tines 34 and 35 are both arranged with their lowermost ends further remote from the corresponding axis of rotation than their uppermost ends and it will be noted that the construction of soil working member or rotor that is illustrated in FIG. 12 is particularly suitable for operation on very stoney ground because the stones are more readily loosened than when tines are employed which all have soil working portions of substantially the same length. With the construction of FIG. 12 of the drawings, the soil is worked in layers to some extent.

FIGS. 13 and 14 of the drawings illustrate an embodiment in which each soil working member or rotor has two tines 40 whose upper fastening portions 41 are arranged in holders carried by arms 42 that are pivotable relative to a central tine support 44. The opposite ends of the tine support 44 are formed with forked brackets 45 and the radially inner ends of the arms 42 are turnably mounted between the limbs of said brackets 45 by substantially vertical pivot pins 43 that extend parallel to the longitudinal axes of the shafts 2. The pins 43 extend upwardly beyond the upper limbs of the corresponding brackets 45 and are surrounded by helical springs 46 that bear between stops 45A mounted on top of the arms 42 and stops 47 mounted on top of the tine support 44. The springs 43 are so arranged as to tend to turn the arms 42 against corresponding stop plates 48 carried by the support 44 alongside the pivot pins 43. If, during the use of a rotary harrow having soil working members or rotors of the kind illustrated in FIGS. 13 and 14 of the drawings, one of the tines 40 should meet a large stone or other obstacle, that tine can deflect rearwardly about the corresponding pivot pin 43 with respect to the direction of rotation of the corresponding soil working member or rotor. As soon as the obstacle has been moved or avoided, the displaced tine 40 and the arm 42 by which it is carried will be moved back to a position similar to that illustrated in FIG. 14 under the action of the corresponding strong spring 46 in which position the arm 42 again bears against the corresponding stop plate 48.

The various tines that have been mentioned above may have any desired cross-sectional configuration. The tines may, for example, be of circular or angular cross-section and, when an angular cross-section is provided, grooves may be formed to extend longitudinally of the tines in at least some of the sides of said angular cross-section. The sides of the angular cross-section with such a construction are preferably of dissimilar lengths. As a further alternative, the tines may be replaced by knife-edged soil engaging members.

While certain features of the rotary harrows that have been described and/or illustrated in the accompanying drawings will be set forth in the following claims as inventive features, it is emphasised that the invention is not necessarily limited to those features and that it includes within its scope all of the parts of each rotary harrow construction that have been described and/or illustrated both individually and in various comvinations.

What we claim is:

1. A rotary harrow comprising a frame having a transverse frame portion and drive means for driving a plurality of adjacent soil-working members rotatably mounted on said frame portion in a row extending transverse to the direction of travel, each soil-working member rotatably mounted on an upwardly extending shaft and having tine means comprising at least one tine that is offset relative to said upwardly extending shaft, said drive means being connected to rotate adjacent soil-working members in opposite directions, said one tine having an upper fastening portion secured to a generally horizontal support and a downwardly extending soil-working portion, said generally horizontal support being connected to said upwardly extending shaft, whereby said tine is rotated through a circular path, protective screen means supported on said frame portion and comprising a screen depending downwardly therefrom, said screen being positioned entirely below said frame portion and extending between the shafts of two adjacent soil-working members, said screen extending at least 180° around the shaft of one soil-working member of said adjacent soil-working members, said screen extending downwardly to terminate at a level adjacent the bottom of the tine fastening portion of said one soil-working member.

2. A harrow as claimed in claim 1, wherein each soil-working member has only one tine with a soil working portion that extends substantially vertically from said horizontal support.

3. A harrow as claimed in claim 1, wherein said adjacent soil-working members have corresponding supports and each support has a radial length with respect to the axis of rotation of its corresponding shaft that is greater than half the perpendicular distance between the shafts of said adjacent members.

4. A harrow as claimed in claim 1, wherein each support extends radially beyond its corresponding shaft and the opposite ends of said support have tine holders.

5. A harrow as claimed in claim 4, wherein said support comprises two tines mounted on said opposite ends, one of said two tines being substantially shorter in length than the second of said two tines.

6. A harrow as claimed in claim 5, wherein the soil-working portion of the shorter tine has a length which is not less than about one-third the length of the soil-working portion of the longer tine.

7. A harrow as claimed in claim 1, wherein said one soil-working member has only one tine and said horizontal support is rotatable within said screen.

8. A harrow as claimed in claim 1, wherein said screen is bent and comprises collar means that at least partly surrounds said generally horizontal support.

9. A harrow as claimed in claim 8, wherein said bent screen comprises a cylindrical collar secured to said frame portion substantially concentrically around the shaft of said one soil-working member, said shaft being journaled in bearing means mounted on said frame portion and being located within said cylindrical collar.

10. A harrow as claimed in claim 9, wherein each soil-working member has its respective shaft and cylindrical collar, the center of each cylindrical collar substantially coinciding with the center line of the corresponding shaft.

11. A harrow as claimed in claim 10, wherein each cylindrical collar has an access opening at its rear with respect to the normal direction of travel of the harrow.

12. A harrow as claimed in claim 10, wherein each horizontal support has an outer end that is remote from its corresponding upwardly extending shaft, said outer end being located closely adjacent an inner surface of its respesctive cylindrical collar.

* * * * *